Sept. 22, 1942.   E. C. MERRY   2,296,681
MULTIPLE REAR AXLE ASSEMBLY
Filed Feb. 29, 1940   4 Sheets-Sheet 2
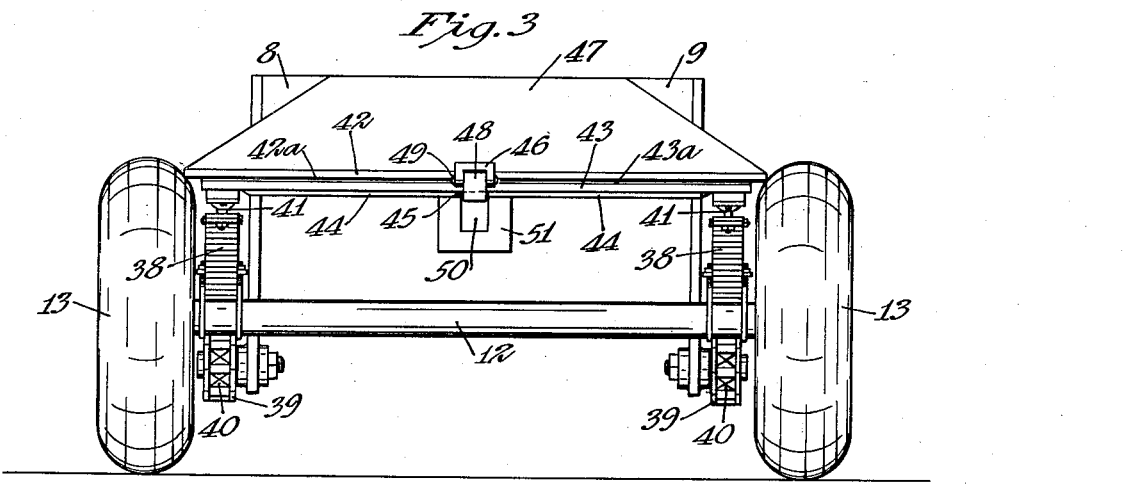
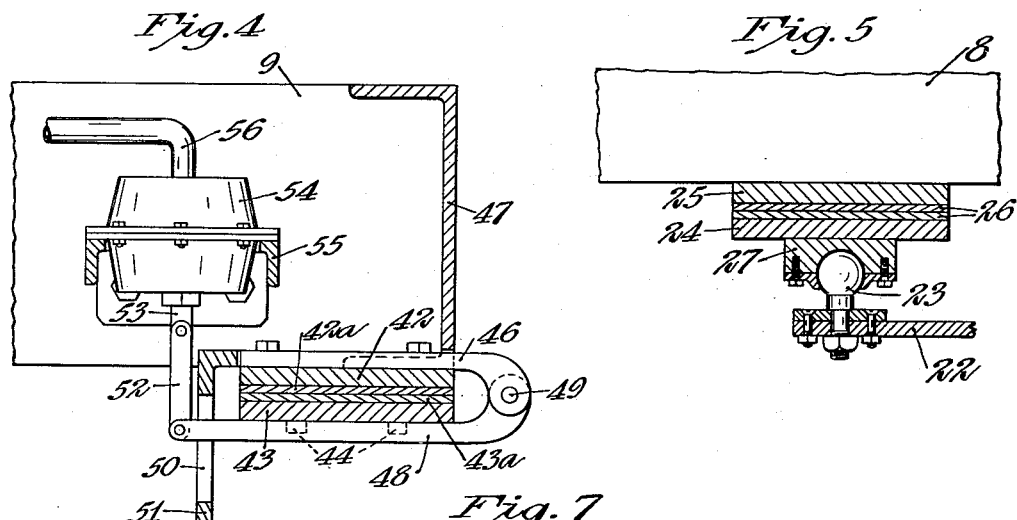
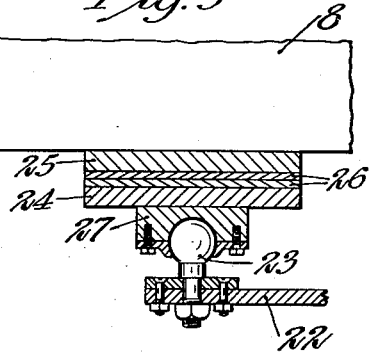
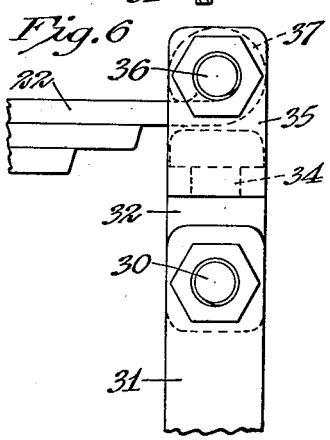
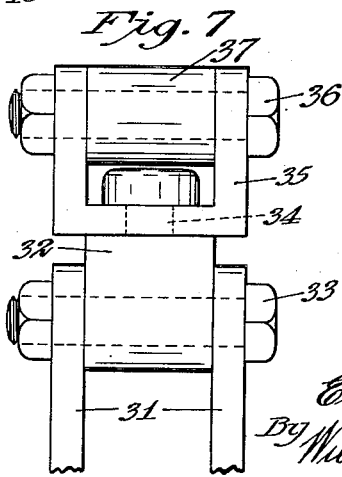
Inventor
Edward C. Merry
By Williamson & Williamson
Attorneys

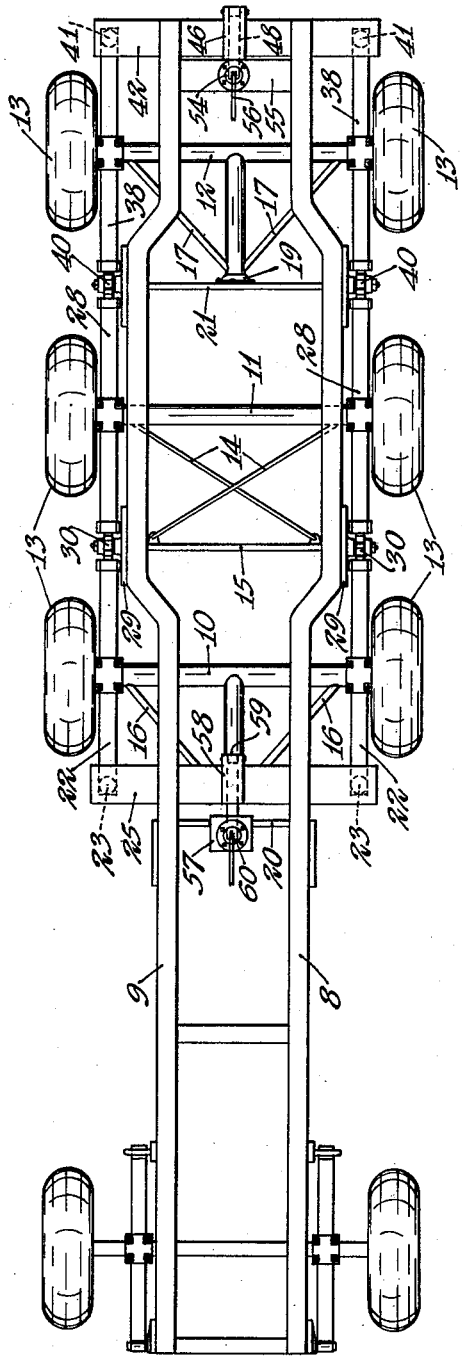

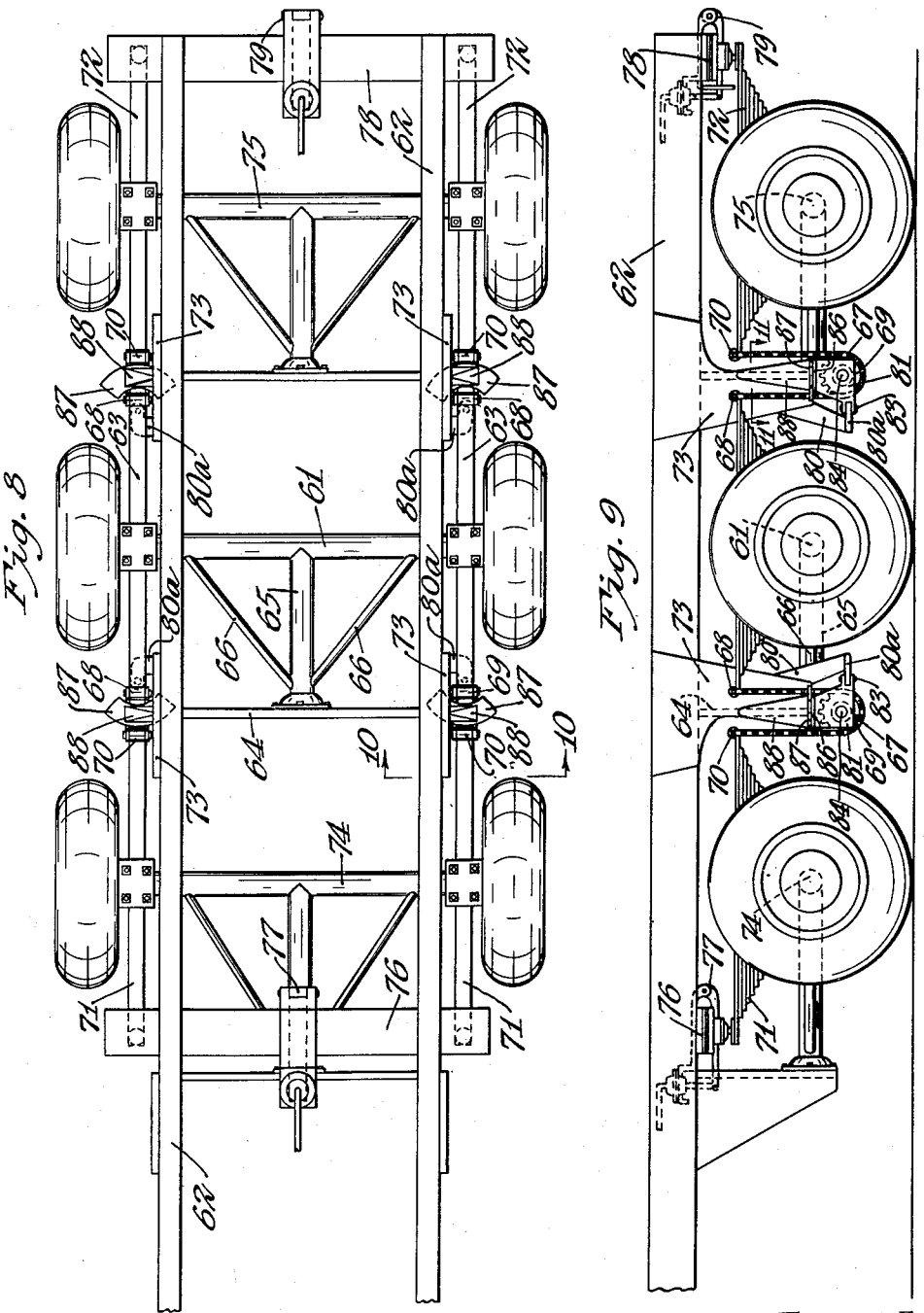

Sept. 22, 1942.     E. C. MERRY     2,296,681
MULTIPLE REAR AXLE ASSEMBLY
Filed Feb. 29, 1940     4 Sheets-Sheet 4
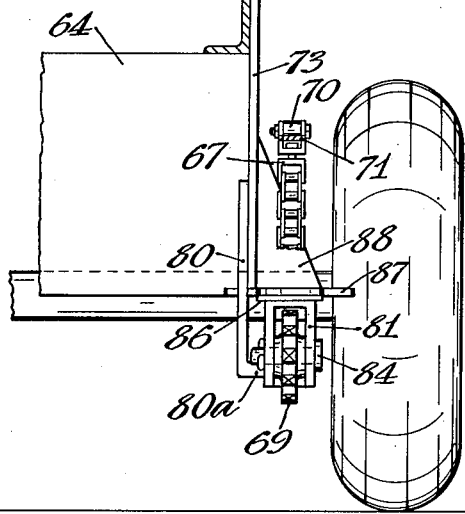
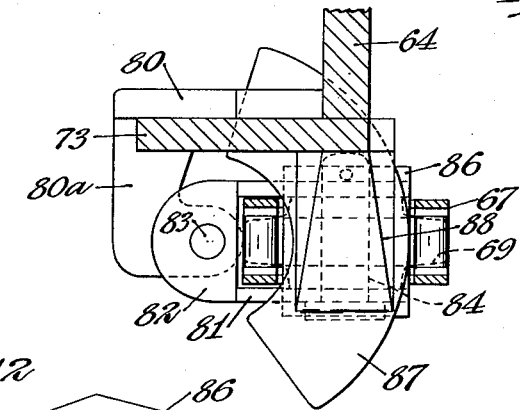
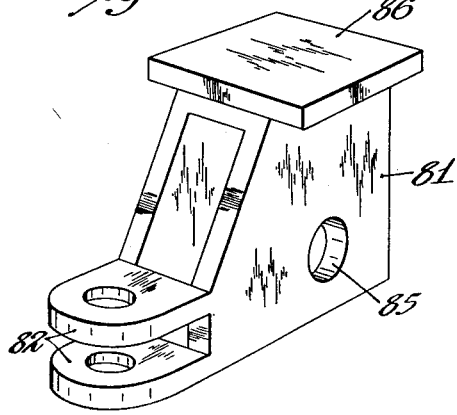
Inventor
Edward C. Merry
By Williamson & Williamson
Attorneys Patented Sept. 22, 1942

2,296,681

UNITED STATES PATENT OFFICE 2,296,681

MULTIPLE REAR AXLE ASSEMBLY

Edward Chase Merry, Birmingham, Mich., assignor, by direct and mesne assignments, to Merry-Neville Manufacturing Company, Birmingham, Mich., a corporation of Michigan Application February 29, 1940, Serial No. 321,439

2 Claims. (Cl. 280—124)

This invention relates to vehicle constructions and more particularly to commercial motor vehicles having multiple rear axle assemblies.

In my previously issued Patent Number 2,135,906, dated November 8, 1938, there is disclosed a multiple rear axle construction wherein at least one fixed rear axle and one laterally movable rear axle is utilized. The lateral movement of the movable axle is accomplished through the use of what might be termed a slide plate unit. This includes a plate fixed to the frame substantially transversely thereof and a laterally movable plate in sliding contact with the first plate and connected to the laterally movable axle. There is also disclosed a multiple power unit and drive connections to independently driven rear axles.

In my co-pending application, S. N. 233,776, filed October 7, 1938, now Patent 2,272,572, I have disclosed variations of multiple axle assemblies which preferably include three or more rear axle units. These units are arranged so that either the foremost or the rearmost of the rear axles is fixed against lateral movement and the other axles are laterally movable. This lateral movement is provided to facilitate the making of turns where multiple rear axles are used. In the case of a multiple axle assembly wherein the foremost rear axle is fixed, the pivotal swinging point of the frame of the vehicle is at that axle, and the axles which trail therebehind are adapted to move laterally with respect to the frame permitting the rear end of the frame to swing. In the case of the construction wherein the rearmost of the multiple rear axles is fixed, the rear axles in front of this fixed axle are connected to the frame for relative lateral movement with respect thereto, and the rear of the frame adjacent the fixed axle is the point of pivotal movement of the frame in describing a turn.

In the present application I provide a multiple rear axle assembly wherein there is a forward axle unit which is laterally movable and a rearward axle unit which is similarly movable, and I also provide an intermediate fixed axle. With this construction there is not so great a lateral movement of any of the movable axles since the fixed intermediate axle places the pivot point of the frame when turning, in between said movable axles.

I have also provided a vehicle frame structure which will permit the frame to be built close to its supporting axles and at the same time provide for a considerable amount of relative lateral movement between the movable axles and the frame.

In the above identified patent and application I have provided spring suspensions wherein leaf springs lie longitudinally of the frame and are connected to their respective axles intermediate the ends of said springs. The adjacent ends of springs on these axle units are connected by flexible connections which include chains extending around pulleys and having their ends secured to said adjacent spring ends. Since the axles in a multiple assembly of this type are relatively close together this flexible connection between the adjacent springs permits the wheels on the different axle units to remain in contact with the roadway even under rough road conditions.

In addition to the above set forth objects of the present invention a further object is to provide a swivel connection between the connector chains and the ends of the springs to which they are attached. This swivel connection is provided since the chains are of a type which cannot be twisted so that they will properly ride upon toothed pulleys and it is desirable to have a swivel connection particularly where the axle unit is laterally movable.

Another object of the invention is to provide a substantially universal connection between a spring end and one of the relatively slidable plates in the slide plate assembly which provides for said above described lateral movement. The universal connection not only provides for flexing of the spring due to road conditions but also provides for movement between the spring and the slide plate unit.

In a multiple rear axle assembly wherein certain of the axles are laterally movable with respect to the frame, it is extremely difficult to drive the vehicle in a rearward direction since the laterally movable axles tend to get out of line. It is, therefore, still another object of the invention to provide means for locking the laterally movable axles in normal alignment with the longitudinal center of the frame when desired.

These and other objects and advantages of the invention will more fully appear from the following description made in connection with the accompanying drawings, wherein like reference characters refer to the same parts throughout the views, and, in which:

Fig. 1 is a plan view of a vehicle frame constructed in accordance with my invention;

Fig. 2 is a side elevation thereof;

Fig. 3 is a rear end elevation;

Fig. 4 is an enlarged sectional view through a slide plate assembly showing the locking means therefor;

Fig. 5 is an enlarged sectional detail of the universal connection between a spring leaf and the slide plate assembly;

Fig. 6 is a fragmentary side elevation of a leaf spring and a swiveled chain connection;

Fig. 7 is an end view of the spring and chain connection;

Fig. 8 is a plan view of a portion of a vehicle chassis showing another form of my invention;

Fig. 9 is a longitudinal vertical section through the structure shown in Fig. 8;

Fig. 10 is an enlarged section taken approximately on the line 10—10 of Fig. 8;

Fig. 11 is an enlarged section taken approximately on the line 11—11 of Fig. 9; and Fig. 12 is an enlarged perspective of the chain sprocket hanger.

Figs. 1 and 2 of the drawings illustrate a trailer construction, but, of course, it is immaterial whether the vehicle is a trailer or is self-propelled. The vehicle frame includes a pair of side frame members 8 and 9. As shown they extend rearwardly from the forward end in parallel relationship and are provided with widened portions adjacent the rear for a purpose to be brought out below. The rear of the vehicle is supported by three axle units 10, 11 and 12, each of which is supported by the usual wheels 13. The intermediate axle 11 is connected by tie rods 14 to a plate 15 which is rigidly supported between the side frame members 8 and 9. The tie rods 14 are connected to the plates 15 on horizontal pivots to permit the axle 11 to swing in a vertical arc but to retain the axle against lateral movement with respect to the vehicle frame.

The foremost and rearmost rear axles 10 and 12 have radius rods 16 and 17 which are connected through universal joints 18 and 19 respectively to plates 20 and 21 which extend between the vehicle side frame elements 8 and 9. The universal joints 18 and 19 permit the axles 10 and 12 to move upwardly and downwardly with respect to the frame and in addition permit these axles to swing laterally with respect to the frame. The forward axle 10 has a pair of leaf springs 22 connected thereto intermediate the ends of said springs which lie longitudinally of the vehicle frame. The forward ends of springs 22 are connected by ball and socket joints 23 to the lower element of a slide plate unit best shown in Fig. 5. The slide plate unit comprises plates 24 and 25, the plate 25 being connected between the side frame elements 8 and 9 and rigidly secured thereto. The lower plate 24 is slidable with respect to the plate 25 in a direction transversely of the frame and if desired wear surfaces 26 may be provided on the adjacent faces of the two slide plates. On the end of a spring 22, as above described, is a ball joint connection including the ball 23 and a socket 27. The socket is secured to the movable slide plate 24 and the ball is suitably secured to the end of the spring 22.

The rear ends of springs 22 terminate adjacent springs 28 which are connected to the intermediate or fixed axle 11. Rigid braces 29 extend downwardly from each of the frame members 8 and 9, and each of these braces carries a toothed pulley 30. A chain 31 has its ends connected to the adjacent ends of the springs 22 and 28 on the respective axle units and said chain extends around and beneath the pulley 30.

The chains 31, as best shown in Figs. 6 and 7, include side link members and spaced cross links, and the chains are so constructed that they will not twist. This type of chain is well known in various types of chain drive mechanisms. The end of each chain is provided with a cross link 32 held by a bolt 33. The cross link 32 is provided with a pivot pin 34 which extends through a U-shaped connector 35. The U-shaped element 35 carries a bolt 36 which extends through the rolled-over end 37 of one of the leaf spring elements, such as one of the forward leaf springs 22. When the forward axle 10 shifts laterally with respect to the vehicle due to the slide plate construction, the ball joint shown in Fig. 5 will permit relative movement between the forward end of spring 22 and the slide plate 24, and the swivel connection provided by the swivel pin 34 and its cooperative structure permits the rear end of each of the springs 22 to swing slightly relative to each of the chains 31.

The rearward axle 12, as stated above, is connected to a cross brace or plate 21 through the medium of radius rods 17 and an universal joint 19. The axle has a set of springs 38 secured thereto in the same manner as springs 22 on the foremost axle 10. The front ends of springs 38 are swivelly connected to chains 39 running around toothed pulleys 40. The chains 39 also connect with the rear ends of springs 28 secured to the relatively stationary axle 11.

The rear ends of springs 38 are connected by means of a ball and socket connection 41 to a slide plate unit. The general construction of this assembly is the same as in Fig. 5 and similar to the slide plate connection between springs 22 and the frame in conjunction with forward axle 10.

Each of the slide plate assemblies at the forward and rearward ends of the multiple axle assembly is provided with locking mechanism best illustrated in Figs. 3 and 4. While each of the slide plate units has locking mechanism, the one illustrated and described is the one which in this embodiment is shown in connection with the rearward slide plate. It includes an upper plate 42 supported between the frame side members, one of which is shown at 9 in Fig. 4, and a lower plate 43 which is connected by the above described ball and socket connection to the rear ends of leaf springs 38. This slide plate unit is provided with wear plates 42a and 43a. The lower plate 43 is provided with a pair of strengthening ribs 44 which extend substantially throughout the length of said slide plate but which are notched adjacent their centers and indicated at 45. A hinge arm 46 is connected transversely of the central portion of the upper slide plate 42. This arm extends rearwardly through the frame rear cross member 47 and is turned down at its rear end. A cooperating hinge arm 48 is pivotally connected to the rear end of the arm 46 by a pintle 49. The arm 48 extends forwardly beneath the lower slide plate 43 and through an aperture 50 in a guide 51 which extends downwardly from the forward end of the upper hinge arm 46. In the position shown in Figs. 3 and 4, the lower arm 48 is positioned in the notches 45 formed in the ribs 44 on the lower side of the lower slide plate 43. Thus the two slide plates are locked together. The lower hinge locking arm 48 is connected by a link 52 to a plunger 53 which is in turn connected to a diaphragm in the casing 54. The casing is supported between the frame elements 8 and 9 on transverse brackets 55. Only the outer casing of the diaphragm element is shown since it is a conventional fluid pressure diaphragm. The diaphragm is connected by suitable tubing 56 to a power source such as the intake manifold of an internal combustion engine or the connection could be reversed to the lower side of the diaphragm and connection made with the hydraulic or air brake system of the vehicle. It is contemplated that a telltale light be installed in the control cab of the vehicle to indicate when the slide plates are locked together. When thus locked the vehicle can be moved rearwardly and the laterally movable axles will be held in proper alignment and will not interfere with such reverse motion. A locking device similar to the one above described is mounted on a support 57 adjacent the forward slide plate assembly. The upper locking hinge arm is shown at 58 and the end of the lower arm is shown at 59. The diaphragm element is indicated generally by dotted lines 60.

In Figs. 8 through 11 I have shown a modified form of construction, which, however, still includes the use of one or more central fixed axles with laterally movable axles mounted forwardly and rearwardly thereof. The central axle 61 is fixed insofar as it is held against movement transversely of the frame 62. It is connected to leaf springs 63 intermediate the ends of said springs and is also connected to a frame cross member 64 by means of a centrally disposed tube 65 and radius rods 66. This construction of tube and radius rods is the same as that shown on the front and rear axles in Figs. 1 and 2 although the fixed axle may be connected by means of cross rods such as the rods 14 shown in Fig. 1.

The ends of the springs 63 are connected to chains 67 by means of swiveled connections 68, the details of which are similar to the structure shown in Figs. 6 and 7. The chains 67 extend downwardly beneath sprockets 69 and the opposite ends of said chains are swivelly connected at 70 to the rearward and forward ends respectively of springs 71 and 72 as viewed in Figs. 8 and 9. It will be noted that the ends of the central springs 63 are in sliding contact with or only slightly spaced from downwardly extending braces or brackets 73 which depend from the longitudinal side elements of the vehicle frame 62. The ends of springs 63 are adapted to move vertically in plates 73 but the assembly including the axle 61 is held against any movement transversely of the vehicle frame.

The forward and rearward axles 74 and 75 are connected to springs 71 and 72 respectively intermediate the ends of said springs. The forward springs 71 have their forward ends connected to a slide plate assembly 76 which is indicated only generally since it is similar in structure to the slide plate unit shown in Figs. 4 and 5. This unit is provided with a locking mechanism indicated generally at 77 which is also similar to the previously described locking mechanism. The rear end of rear spring 72 is provided with a slide plate assembly 78 and a locking unit 79. It will be noted that portions of the plates 73 are cut away adjacent the rear ends of springs 72 so that they will not interfere with lateral shifting movement of the forward and rearward axle assemblies. Of course, the forward and rearward axles are provided with lead tubes and radius rods connected to cross pieces on the frame as is clearly shown in Fig. 8.

The sprockets 69 in this embodiment of the invention are mounted for swinging movement with respect to the plates 73. As shown in Figs. 9, 10 and 11, the plates 73 have brackets 80 extending downwardly therefrom at an angle and thence outwardly parallel to the ground. These outwardly extending portions of the brackets 80 are indicated at 80a. The portions 80a have pivotally connected thereto housings 81 whose spaced parallel ears 82 are apertured to receive a pivot pin 83 extending through them and through the bracket element 80a. The housings 81 have a pair of spaced side walls as shown in Fig. 12, and the sprockets 69 are adapted to be positioned within said housings on pivot pins 84 which extend through apertures 85 in said housings 81. The sprocket chains extend around or beneath the sprockets 69 and upwardly adjacent each open end of the housings 81.

The tops of the housings are provided with flat faces 86 which are adapted to slidably contact the undersides of horizontally disposed plates 87 which form portions of brackets 88 which extend outwardly from the side faces of the plates 73. The brackets 88 with their horizontal portions 87 are adapted to bear the weight of the vehicle frame which is transferred through them to the sprockets 69, the chains 67 and the springs, axles and wheels.

One or both of the sprocket assembly slide plates 86 and 87 may be made arcuate in shape, but in the drawings only the upper plate 88 is shown in that shape. It should be noted that the pivot pins 83 which connect the sprocket housing 81 to the diagonal brackets 80 is positioned as closely as practical to the upwardly extending portion of each of the chains 67 which is connected to opposite ends of the central or relatively fixed spring 63.

With the construction shown in Figs. 8 through 12, it is possible to secure lateral movement of the forward and rearward axles 74 and 75 without imposing any twisting strain on the chains 67 and also to secure a wider swing of the movable axles laterally of the frame. There are no weights imposed upon the pivotal connections between the sprocket housings 81 and their connecting brackets 80 due to the fact that the sprocket slip plate units 86 and 87 are provided. It is important that the pivot pins 83 of the sprocket housings 81 be positioned as closely as possible to the ends of the springs 63 as above stated so that the pivotal axis of said pins 83 will substantially coincide with the axes of the swiveled connections 68 between the chains 69 and the ends of said springs 63.

Of course, the general operation of this movable axle unit is the same as that shown in Figs. 1 and 2, the wheels on the fixed axles 61 acting in the nature of a point of pivotal movement for the vehicle frame 62 as it describes a turn with the forward end of said frame swinging in one direction and that portion of the frame rearwardly of the axle 61 swinging in an opposite direction when a turn is executed. The slide plate assemblies 76 and 78, as stated above, are similar to and function in the same manner as the previously described slide plate assemblies, and the slide plate locking units 77 and 79 are also similar in structure and function.

From the foregoing description it will be seen that I have provided a vehicle construction which utilizes a plurality of rear axle units wherein forward and rearward axle units are laterally movable and intermediate axle units are rigid. It is, of course, contemplated that there may be more than three rear axles, and if so there may be more than one laterally movable axle in front of or to the rear of one or more intermediate relatively rigid axles.

I have also provided a vehicle wherein certain axles are laterally movable with respect to the frame and wherein these movable axles can be locked against lateral movement so that the vehicle can be moved in a rearward direction. It is, of course, understood that the arrangement of the radius rods which connect the movable axles to cross frame elements forwardly of said movable axles provide for proper alignment of the axles during forward movement on a straight course, and the locking mechanism is, therefore, not needed nor utilized except where highway or load conditions at higher speeds might make it advisable.

I have further provided an improved frame construction which is adaptable for use in connection with laterally movable axles wherein a considerable degree of lateral movement is desired. Furthermore, in connection with the lateral movement of certain axles, I have provided improved connections between certain of the parts connecting the axles to the frame and to adjacent axles which provide for greater flexibility and lessen strains when the axles are moved laterally.

It will, of course, be understood that various changes may be made in the form, details, arrangements and proportions of the various parts without departing from the scope of my invention.

What is claimed is:

1. In a vehicle construction, a frame, an axle relatively stationary with respect to the frame, an axle movable substantially transversely of the frame, a pulley supported by the frame between adjacent ends of the axles, a flexible connection between said adjacent axle ends and beneath said pulley, a pulley hanger on a vertical pivot and having an upwardly disposed bearing member, and a bearing member supported by the frame and contacting the bearing member on said pulley hanger, whereby upward thrust of said flexible connection on said pulley is taken by said contacting bearing members.

2. In a trackless vehicle construction, a frame, a plurality of rear axle units including a forward axle, spring means interposed between said axle and said frame, connecting means between said spring means and said frame permitting substantially endwise movement of said axle transversely of said frame, a rearward axle, spring means interposed between said axle and said frame, connecting means between said spring means and said frame permitting substantially endwise movement of said rearward axle transversely of said frame, an intermediate axle connected to said frame and retained against endwise movement transversely of said frame, spring means connected to said intermediate axle and directly to said frame, and yieldable connections between said last mentioned spring means and those of said forward and rearward axles.

EDWARD CHASE MERRY.